United States Patent [19]

Goretta et al.

[11] 4,070,321
[45] Jan. 24, 1978

[54] PROCESS FOR THE PREPARATION OF WATER-IN-OIL EMULSIONS OF WATER SOLUBLE VINYL CARBOXYLIC ACID POLYMERS AND COPOLYMERS

[75] Inventors: Louis A. Goretta, Naperville; Frederick J. Sibert, Chicago, both of Ill.

[73] Assignee: Nalco Chemical Company, Oak Brook, Ill.

[21] Appl. No.: 746,758

[22] Filed: Dec. 2, 1976

[51] Int. Cl.² ................................................. C08F 2/24
[52] U.S. Cl. ...................... 260/29.6 H; 260/29.6 WQ; 260/33.6 UA
[58] Field of Search .................. 260/29.6 H, 33.6 UA, 260/29.6 WQ

[56] References Cited

U.S. PATENT DOCUMENTS

| | | | |
|---|---|---|---|
| 2,506,537 | 5/1950 | Barnes et al. | 260/29.6 H |
| 3,284,393 | 11/1966 | Vanderhoff et al. | 260/29.6 H |
| 3,493,500 | 2/1970 | Volk et al. | 260/29.6 H |
| 3,624,019 | 11/1971 | Anderson et al. | 260/29.6 H |
| 3,658,772 | 4/1972 | Volk et al. | 260/29.6 H |
| 3,692,726 | 9/1972 | Oehmichen | 260/29.6 H |
| 3,734,873 | 5/1973 | Anderson et al. | 260/29.6 H |
| 3,784,498 | 1/1974 | Ceska | 260/29.6 H |
| 3,826,771 | 7/1974 | Anderson et al. | 260/29.6 H |
| 3,875,099 | 4/1975 | Kurth et al. | 260/29.6 H |
| 3,876,596 | 4/1975 | Grubert et al. | 260/29.6 H |

*Primary Examiner*—Ronald W. Griffin
*Attorney, Agent, or Firm*—John G. Premo; Robert A. Miller; Barry W. Sufrin

[57] ABSTRACT

Water-in-oil emulsions of water soluble vinyl carboxylic acid polymers and copolymers are prepared by:
  A. Forming an emulsion comprising:
    1. 30–95% by weight of an aqueous phase consisting of water and a water soluble vinyl addition monomer containing from 1.0–70.0% by weight of a water soluble vinyl carboxylic acid monomer based on the weight of the monomer;
    2. 5–70% by weight of a hydrophobic oil;
    3. 0.1–21% by weight of a water-in-oil emulsifying agent;
  B. Polymerizing said emulsion under free radical forming conditions; and then,
  C. Recovering a water-in-oil emulsion of a water soluble vinyl carboxylic acid polymer.

The improvement comprising adjusting the pH of the aqueous phase prior to polymerization to a pH of 4.5–8.0.

5 Claims, No Drawings

PROCESS FOR THE PREPARATION OF WATER-IN-OIL EMULSIONS OF WATER SOLUBLE VINYL CARBOXYLIC ACID POLYMERS AND COPOLYMERS

INTRODUCTION

Water-in-oil emulsions of water soluble vinyl addition polymers are now well known in the art and are useful for a variety of applications including but not limited to the dewatering of sewage, as dispersants, thickeners, and for the treatment of industrial and municipal waste. One of the most important varieties of these polymers are those containing vinyl carboxylic acid monomers such as acrylic and methacrylic acids. The inclusion of these monomers into copolymers with other water soluble monomers or by themselves as homopolymers provides a high molecular weight ionic material which is useful in many of the above applications. However, it has been difficult to obtain high molecular weight polymers containing the vinyl carboxylic acids using the methods proposed by the prior art.

While using the process described in Anderson, et al, U.S. Pat. No. 3,624,019 and Vanderhoff U.S. Pat. No. 3,284,393, water-in-oil emulsions of a finely divided vinyl carboxylic acid polymers have been obtained, the molecular weights of these polymers has not been as high as other methods of making these polymers. It has now been found that if prior to polymerization, one adjusts the pH of the aqueous phase containing the vinyl carboxylic acid to a level of between 4.5–8.0 high molecular weight water soluble vinyl carboxylic acid polymers can be obtained.

The prior art showing polymerization of vinyl carboxylic acid monomers with non-ionic water soluble monomers in water-in-oil emulsion form has shown these polymerizations at pH values whereby substantially all of the vinyl carboxylic acid is neutralized with an alkali metal hydroxide to form the corresponding carboxylic acid salt. This has been done, it is believed, to increase the solubility of the carboxylic acid monomers in the aqueous discontinuous phase thereby preventing or minimizing the polymerization of the carboxylic acid which is often soluble in the oil phase from occurring in the continuous oil phase.

It has long been felt that polymerizing mixtures of monomers containing at least one vinyl carboxylic acid would therefore be conducted most satisfactorily at these elevated pH values so as to eliminate polymerization in the oil phase and to prepare a true copolymer. We have now found, however, that if prior to polymerization one only partly neutralizes the aqueous phase containing the vinyl carboxylic acid monomer and a non-ionic acrylamide monomer, improved copolymers, designated as vinyl carboxylic acid polymers in the context of this invention, may be prepared. The method of this invention briefly stated involves adjusting the pH of the aqueous phase containing the vinyl carboxylic acid monomer to a level of from 4.5–8.0 thereby being able to prepare high molecular weight water soluble vinyl carboxylic acid polymers which generally have a higher molecular weight and higher activity then those prepared by the methods of the prior art.

It is, therefore, an object of our invention to provide to the art an improved method for the preparation of a water-in-oil emulsion of water soluble vinyl carboxylic acid polymers and copolymers.

A further object of our invention is to provide to the art a method for the preparation of high molecular weight polymers and copolymers of vinyl carboxylic acids in a water-in-oil emulsion form by prior to polymerization adjusting the pH of the aqueous phase of the emulsion to a pH of 4.5–8.0 with an alkali metal hydroxide.

Other objects will appear hereinafter.

THE INVENTION

The Water-In-Oil Emulsion of Vinyl Carboxylic Acid Polymers

The water-in-oil emulsions of finely divided vinyl carboxylic acid polymers useful in this invention are stable, yet at the same time contain relatively large amounts of polymers. The polymers dispersed in the emulsion are quite stable when the particle size of the polymer is in the range of 2 millimicrons up to about 5 microns. The preferred particle size is within the range of 5 millimicrons and 3 microns.

The stable water-in-oil emulsion comprises:
1. an aqueous phase;
2. a hydrophobic liquid; and
3. a water-in-oil emulsion emulsifying agent.

The polymer containing emulsion of this invention is comprised of an aqueous phase ranging from between 30 and 95% by weight of the emulsion. The aqueous phase is defined as the sum of the polymer or copolymer and the water present in the composition. The preferred range is between 70 and 90% by weight of the emulsion. The most preferred range is between 70 and 80% by weight of the emulsion.

The polymer concentration of the emulsion ranges between 10–50% by weight. A preferred range is between 15–40% by weight of the emulsion. The most preferred range is between 20–40% by weight of the emulsion.

As seen, based on the weight of the aqueous phase and the percent polymer contained in the aqueous phase, the polymer containing emulsion may contain from about 25–85% by weight water.

For the purposes of this invention, the term "vinyl carboxylic acid polymer" is one which contains from 1.0–70% by weight of vinyl carboxylic acid and preferably from 5.0–60% by weight of vinyl carboxylic acid. Most preferably, the vinyl carboxylic acid polymers as used in this invention contain from about 5–50% by weight of a vinyl carboxylic acid monomer. That is, the process of our invention will perform with a water soluble vinyl addition monomer wherein the water soluble vinyl addition monomer contains from 1.0–70% by weight of a water soluble vinyl carboxylic acid monomer based on the weight of the total water soluble vinyl monomer employed. The vinyl carboxylic acid polymers most commonly used in the practice of this invention are copolymers of acrylic and methacrylic acid and their water-soluble salts with other water soluble vinyl addition monomers prepared by polymerizing the vinyl carboxylic acid monomers with monomers such as for instance, acrylamide, methacrylamide, sodium styrene sulfonate, and acrylonitrile. The preferred comonomers with the vinyl carboxylic acids are acrylamide type monomers including acrylamide and methacrylamide.

The molecular weight of the vinyl carboxylic acid polymers described above may vary over a wide range, e.g., 10,000 to 25 million. The preferred vinyl carboxylic acid polymer has a molecular weight in excess of one million.

The organic or oil phase of the emulsion is comprised of an inert hydrophobic liquid. The hydrophobic liquid comprises between 5–70% by weight of the emulsion. The preferred range is between 5–40% by weight of the emulsion. The most preferred range is between 20–30% by weight of the emulsion.

The oils used in preparing these emulsions may be selected from a large group of organic liquid which include liquid hydrocarbons and substituted liquid hydrocarbons. A preferred group of organic liquids are hydrocarbon liquids which include blends of aromatic and aliphatic hydrocarbon compounds, which contain from 6 to 18 carbon atoms. Thus, such organic hydrocarbon liquids as benzene, xylene, toluene, mineral oils, kerosenes, naphtha and in certain instances, petroleum, may be used. A particularly useful oil from the standpoint of its physical and chemical properties is the branch chain isoparaffinic solvent sold by Humble Oil and Refinery Company under the trade name "Isopar M". Typical specifications of this narrow-cut isoparaffinic solvent are set forth below in Table I.

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | |
| IBP | 400 | 410 | |
| Dry point | — | 495 | |
| Flash point, ° F. (Pensky-Martens closed cup) | 160 | — | ASTM D 93 |

Any conventional water-in-oil emulsifying agent can be used such as sorbitan monostearate, sorbitan monooleate, and the so-called low HLB materials which are all documented in the literature and are summarized in the Atlas HLB Surfactant Selector. Although the mentioned emulsifiers are used in producing good water-in-oil emulsions, other surfactants may be used as long as they are capable of producing these emulsions. The water-in-oil emulsifying agent is present in amounts ranging between 0.1 and 21.0% by weight of the emulsion. The preferred range is between 1.0 and 15.0% by weight of the emulsion. The most preferred range is between 1.2 and 10% by weight of the emulsion.

The polymers contemplated for use in this invention maybe synthesized in emulsion form as described in Vanderhoff et al, U.S. Pat. No. 3,284,393 which is hereby incorporated by reference. The polymerization technique set forth in Vanderhoff is generally followed in preparing polymeric latexes used in this invention.

Also contemplated in the practice of this invention is the preparation of suitable water-in-oil emulsions of water-soluble polymers by the methods described in Anderson et al, U.S. Pat. No. 3,624,019 and U.S. Pat. No. 3,734,873, both of which are hereby incorporated by reference.

The water-in-oil emulsions used in the practice of this invention exhibit the unique ability of rapidly dissolving into aqueous solution. The polymer-containing emulsion releases the polymer in water in the presence of a surfactant in a very short period of time. This inversion technique is described in Anderson et al, U.S. Pat. No. 3,624,019 and U.S. Pat. No. 3,734,873.

THE CARBOXYLIC ACIDS

The vinyl carboxylic acids which we contemplate for use in our invention include the common commercially available materials such as acrylic and methacrylic acids. It is also suspected that our invention will perform adequately when other vinyl carboxylic acid monomers such as itaconic, maleic and other well known organic vinyl carboxylic acids are used.

THE PROCESS

The process of our invention for the preparation of water-in-oil emulsions of water soluble vinyl carboxylic acid polymers generally comprises:
A. Forming an emulsion comprising:
  1. 30 – 95% by weight of an aqueous phase consisting of water and a water soluble vinyl addition monomer said water soluble vinyl addition monomer containing from 1.0–70% by weight of a water soluble vinyl carboxylic acid monomer based on the weight of the monomer;
  2. 5 – 70% by weight of a hydrophobic oil;
  3. 0.1 – 21% by weight of a water-in-oil emulsifying agent;
B. Polymerizing said emulsion under free radical forming conditions; and then,
C. Recovering a water-in-oil emulsions of a water soluble vinyl carboxylic acid polymer;

The improvement comprising adjusting the pH of the aqueous phase prior to polymerization to a pH of 4.5 – 8.5.

Generally, the aqueous phase will consist of water and the monomer or monomers selected. By raising the pH of the aqueous phase to the level specified in our invention, particular high molecular weight polymers or copolymers of unsaturated carboxylic acids are formed. The pH useful in our invention for the optimum molecular weight will generally depend on the content of acrylic monomer present. As an example, a polymer containing approximately 95% acrylamide and 5% acrylic acid, a pH of around 6.25 is preferred, however, with a polymer containing 50% acrylamide, a pH of approximately 8.0 is desirable. Generally, the pH range of our invention will range from 4.5–8.0 and preferably from 5.0–8.0. Most preferably the pH ranges from 5.0–7.0. This is contrary to the normal methods of polymerizing carboxylic acid type monomers in that by the prior art due to the rate of polymerization and solubility, the pH has generally been raised to a point whereby all of the carboxylic groups have been neutralized and the acid has been basically in a salt form.

In the course of our invention, we have found it both unnecessary and undesirable to neutralize all of the carboxylic acid functionality. We do not understand why a lower pH produces superior polymeric products.

The bases which are useful in the neutralization of the vinyl carboxylic acids of our invention include but are not limited to alkali metal hydroxides including sodium and potassium hydroxide. The concentration of the base can vary greatly and it will be apparent to those skilled in the art that the use of concentrated materials can be used if there is no damage of hydrolysis or otherwise interacting with other monomers that are present. For example, if acrylamide is selected as a monomer, it is often times not advisable to use a concentrated base due to the possibility of hydrolyzing the amide to the acid.

This problem can be avoided and it is often times preferred to neutralize the aqueous solution containing the vinyl carboxylic acid separately. The aqueous neutralized acid solution is then added to a solution of a comonomer such as acrylamide followed by adding this aqueous phase to the oil and emulsifier so as to prepare a latex. In cases such as this, concentrated solutions of alkali metal hydroxides can be used without difficulty. It should be understood in the course of our invention that the concentration of the base is not important so long as the desired pH is maintained and no damage to other monomers is noted.

In order to illustrate the effects of pH in the instant invention, several polymerizations were conducted using the techniques previously described. These polymerizations were conducted in a 1½ liter resin flask equipped with stirrer, themometer, condenser, nitrogen spare tube, heating mantle, and means for cooling. To each flask was charged 256g of Isopar M containing dissolved therein 13.3g of sorbitan monooleate. A monomer solution consisting of 173.5g of water, 389.5g aqueous solution containing 47.5% acrylamide and 80g of acrylic acid was adjusted to the desired pH using 50% sodium hydroxide (usually 80–88g), .05g of Na EDTA was then added. With stirring, the monomer solution was added to the oil phase, purged with nitrogen and heated to a temperature of 40° C; 0.6g of azobisisobutyronitrile in acetone was then added and with continuing nitrogen purging and cooling, the reaction was held at the temperature for 4½ hours. At the end of this time, the temperature was increased to 75° C for one hour for a total of 5.5 hours reaction time. The resulting latex polymers was then cooled and recovered. Intrinsic viscosities in .1N sodium nitrate were run prior to and after high temperature post heating. The following table (Table II) shows the effect of aqueous phase pH on the resulting molecular weight of polymers prepared in this manner.

TABLE II

| Example | pH of Aqueous Phase | Intrinsic Viscosity 4.5 hrs. | Intrinsic Viscosity 5.5 hrs. |
|---|---|---|---|
| 1 | 8.5 | 22.4 | 9.5 |
| 2 | 8.5 | 19.1 | 13.2 |
| 3 | 8.5 | 16.5 | 16.5[1] |
| 4 | 8.5 | 21.0 | 18.2[1] |
| 5 | 8.5 | 26.8 | 26.9 |
| 6 | 7.5 | 24.1 | 23.2 |
| 7 | 7.5 | 22.7 | 23.7[1] |
| 8 | 7.5 | 25.0 | 16.1[1] |
| 9 | 7.5 | 27.3 | 26.3 |
| 10 | 6.5 | 25.2 | 25.1 |
| 11 | 6.5 | 24.8 24.2 | |
| 12 | 6.5 | 23.6 | 23.1[1] |
| 13 | 6.5 | 20.0 | 24.4 |
| 14 | 6.5 | 22.4 | 24.1[1] |
| 15 | 6.5 | 30.8 | 29.0 |
| 16 | 5.5 | 24.3 | 21.8[1] |
| 17 | 4.5 | 14.5 | 14.5[1] |
| 18 | 2.95 | 7.5 | 7.1 |

[1]Emulsifier was 12.5 g sorbitan monoleate and 7.5g Tween 61, a sorbitan monostearate reacted with four moles of ethyleneoxide available commercially from ICI America, Inc.

We claim:
1. In an improved method for the preparation of water-in-oil emulsions of high molecular weight water soluble vinyl carboxylic acid polymers, said method comprising:
   A. Forming an emulsion comprising:
      1. 30–95% by weight of an aqueous phase consisting of water and a water soluble vinyl addition monomer said water soluble vinyl addition monomer containing from 1.0–70.0% by weight of a water soluble vinyl carboxylic acid monomer based on the weight of the monomer;
      2. 5.0–70.0% by weight of a hydrophilic oil;
      3. 0.1–21.0% by weight of a water-in-oil emulsifying agent;
   B. Polymerizing said emulsion under free radical forming conditions; and then,
   C. Recovering a water-in-oil emulsion of a high molecular weight water soluble vinyl carboxylic acid polymer; the improvement comprising adjusting the pH of the aqueous phase to between 4.5–8.0 prior to polymerization.
2. The improvement of claim 1 wherein the vinyl carboxylic acid is selected from the group consisting of acrylic acid and methacrylic acid.
3. The improvement of claim 1 wherein the vinyl carboxylic polymer contains acrylamide as a comonomer.
4. The improvement of claim 1 wherein the pH is adjusted to from 5.0–7.0.
5. The improvement of claim 1 wherein the pH of the aqueous phase is adjusted with an alkali metal hydroxide.

* * * * *